United States Patent [19]

Jameson et al.

[11] 4,212,768

[45] Jul. 15, 1980

[54] ELECTROLESS PLATING OF NONCONDUCTIVE SUBSTRATES

[76] Inventors: Melvin N. Jameson, Rte. 1, St. Marys, W. Va. 26170; Gerald A. Krulik, Rte. 1, Box 212, Washington, W. Va. 26181

[21] Appl. No.: 574,498

[22] Filed: May 5, 1975

[51] Int. Cl.$^2$ .................... B01J 27/06; C09D 5/00; C23C 3/00
[52] U.S. Cl. .................... 252/441; 252/429 R; 252/440; 252/434; 252/436; 106/1.24; 106/1.28; 427/304; 204/30
[58] Field of Search .................... 252/429 R, 440, 441, 252/434, 436; 106/1, 1.24, 1.28; 427/304; 204/30; 423/463

[56] References Cited

U.S. PATENT DOCUMENTS

| | | | |
|---|---|---|---|
| 3,011,920 | 12/1961 | Shipley | 252/472 X |
| 3,532,518 | 10/1970 | D'Ottavio | 106/1 |
| 3,565,823 | 2/1971 | Parshall | 252/431 N |
| 3,672,923 | 6/1972 | Zeblisky | 204/30 X |
| 3,817,774 | 6/1974 | Kuzmik | 427/304 X |
| 3,874,897 | 4/1975 | Fadgen | 106/1 X |
| 3,902,908 | 9/1975 | Rantell | 204/30 X |

*Primary Examiner*—John F. Niebling
*Attorney, Agent, or Firm*—Fay & Sharpe

[57] ABSTRACT

An electroless plating catalyst prepared by reacting a tin salt in the molten state with a precious metal compound without HCl or added $H_2O$. The final catalyst may be a solid or a liquid at room temperature, depending on the reaction conditions, and it can be reconstituted by dilution with an appropriate aqueous solution to prepare or replenish catalytic working baths for electroless plating. Examples include the molten salt reaction of a noble metal salt with molten stannous chloride, stannous chloride dihydrate, or mixtures with other compatible materials containing either or both.

28 Claims, No Drawings

ELECTROLESS PLATING OF NONCONDUCTIVE SUBSTRATES

BACKGROUND OF THE INVENTION

1. Field of the Invention:

Catalytically active compositions for use in plating metal on a nonconductive substrate.

2. Description of the Prior Art:

U.S. Pat. No. 3,011,920 (Shipley) describes a process in which a colloidal solution is prepared by mixing an aqueous acid solution of palladium chloride with an aqueous acid solution of stannous chloride and optionally including a tin salt such as sodium stannate. This is purported to produce a lyophilic colloid which, after acceleration with an acid or alkaline solution such as hydrochloric acid or sodium hydroxide provides a sensitizing layer for the subsequent electroless plating of a metal such as copper.

U.S. Pat. No. 3,672,923 (Zeblisky) describes solid compositions dilutable to optically clear sensitizing solutions for electroless plating. These solutions are prepared by combining a dilute solution of a noble metal salt in hydrochloric acid with a hydrochloric acid solution of a stannous salt such as stannous chloride dihydrate. The mixture is heated and then subsequently cooled and evaporated to dryness under vacuum to constant weight. The solid composition, as described, may then be reconstituted in hydrochloric acid to provide an active sensitizing solution.

SUMMARY OF THE INVENTION

The present invention relates to catalytically active compositions for rendering the surface of a nonconductive substrate receptive to an electroless plating solution to form a uniformly adherent layer of metal. This layer, sometimes referred to as the preplate, may then be electrolytically plated in any conventional manner. It is well understood in the art that the sensitizing step, described above, is preceeded by a surface treatment which renders the substrate surface capable of forming a tight bond. This is normally done by etching in a strong oxidizing acid solution such as chromic acid, or mixtures of oxidizing and non-oxidizing acids such as chromic and sulfuric acids.

As described above in connection with the discussion of the prior art, the solutions heretofore recognized as being effective for catalytic sensitization of the surface are so-called palladium-tin systems in which a palladium salt, such as palladium chloride, and a tin salt such as stannous chloride, are prepared by carefully mixing solutions (in aqueous hydrochloric acid) to form a solution which may or may not be colloidal in nature. It should be noted that whereas the Shipley patent purports to describe a colloidal system, the Zeblisky patent describes optically clear solutions which are stated to be noncolloidal in nature. In any event, the solutions in both cases are prepared by a reaction in aqueous acid solution to form the sensitizing composition whether it be a colloid or a complex. Some problems may be experienced in preparing the Zeblisky compositions because of the difficulty in removing all excess water and hydrochloric acid. It is necessary to evaporate the solution to dryness to produce the solid compositions therein described, and the catalytic activity and stability can be seriously affected if water and/or acid remains after evaporation.

It would, of course, be desirable to provide compositions in solid form because of their ease in handling. This is especially true when considering the difficulty of replenishing an existing working bath. If the replenish solution is added in relatively dilute liquid form, it is normal practice to remove an equivalent volume of the exhausted bath to make room for the addition. If the materials can be added in solid form it is only necessary to calculate the amount of composition needed to bring the bath up to working strength and then add the solid catalyst. Moreover, it is obvious that shipping and storage of a dry material (or liquid concentrate) would be more economical; and the fact that acid solutions are not involved reduces the safety hazards in handling the catalyst.

There are some practical limitations on how concentrated one can make known catalyst solutions without running into crystallization and stability problems. The maximum concentration normal in commercial use is about four pounds of stannous chloride and 20 g of palladium chloride per gallon of solution. A solid catalyst, of the type described herein, can be made substantially of only stannous chloride and the catalytic palladium chloride-stannous chloride reaction product, leading to much more concentrated and stable compositions.

The compositions herein described are prepared by mixing a molten tin halide component, such as stannous chloride and/or stannous chloride dihydrate (with or without stannic chloride or its hydrates), with a noble metal salt. Additional compounds may be used to improve the yield of catalytic reaction products, to control the melting point of the final product, to stabilize the final working bath, to act as inert diluents for the product, and for other reasons.

No water or acid of any kind are added; and the only water present is the water of crystallization. By controlling the total amount of water of crystallization in the final product, one can conveniently control the melting point of the final product and thereby predetermine whether the product is a solid or a liquid at room temperature. Also, inert diluents (that play no part in preparing the catalytic species) may be added to help determine the melting point, the friability, the speed of dissolution, or other properties of the catalyst concentrate.

The prior art, as exemplified by Shipley and Zeblisky, teaches that to make an active catalyst, the active catalyst species must be prepared in the presence of an aqueous hydrochloric acid. Zeblisky further suggests that the complex can then be dried, if desired. The present invention gives the following improvements over all known prior art:

1. The active catalyst species is formed by reaction in a molten salt solution rather than in an aqueous HCl solution.
2. No HCl is needed to produce the active species. All prior art uses a very large amount of HCl.
3. The active catalyst concentration and activity can be optimized by varying the amounts and types of anions added to the molten salt, and these are added in relatively minor amounts compared to the amount of tin chloride.
4. The physical form of the resulting catalyst after the molten salt is cooled to room temperature can be varied from a solid, to a liquid containing some solid, to a liquid composition.
5. The actual catalytic activity per unit weight of palladium is superior to all known commercial products.

6. The air stability of the working bath prepared from this catalyst is greatly superior to all known commercial products. This allows use of this catalyst for longer times without fear of decomposition and also allows use of this catalyst working bath at elevated temperatures with less risk of decomposition.

Because of the nature of the molten salt reaction of tin chloride and a precious metal salt, one is not limited to the maximum reactant concentrations which are soluble in water. This process allows the use of much higher concentrations of the tin chlorides which are desired to react with the precious metal salt. Likewise, the amount of water present is much less than that necessary to give a true solution at room temperature. This enables us to get better yields of catalytically active material and in a more concentrated form than has even been possible before.

DETAILED DESCRIPTION OF THE INVENTION

In order to best understand the principles of the present invention, the following examples are provided for illustrative purposes only.

EXAMPLE 1

A double salt was prepared by dissolving 1.5 gm. of $PdCl_2$ and 5.04 gm. KCl in 37.5 ml. of water and evaporating to dryness. This dried material was a double salt, potassium chloropalladite, in excess of KCl, sometimes referred to herein as the "double salt mixture". One hundred twenty grams of $SnCl_2.2H_2O$ were added to the double salt mixture and heated for 10 minutes at 85° C. A 9 gm. sample was removed and dissolved in 121 mls. of HCl and 375 mls. of $H_2O$ to prepare a sensitizer solution for plating an ABS resin (Borg-Warner Chemicals EP 3510).

Standard test plaques were sequenced through a preplate cycle which included the following steps: (1) preliminary etching of the plaque in a chromic-sulfuric acid etch bath, (2) rinsing in water, (3) neutralizing any remaining acid upon the surface, (4) sensitizing in the catalytic solutions as described above, (5) acceleration of the sensitizer, and (6) immersion in an electroless nickel bath which contained a source of nickel cations, a hypophosphite reducer, and various stabilizing and buffering compositions. A more detailed description of the preferred concentrations and immersion times is found in "Preplate Systems" by John Robertson, *Products Finishing*, Vol. 37, No. 4 (January 1973).

Coverage of the electroless nickel over the surface of the plaques ranged from very good to excellent.

EXAMPLE II—IV

Twenty grams of $PdCl_2$ and 67.2 gms. of KCl were dissolved in approximately 200 mls. of water in a 1 liter 3-neck flask and evaporated to dryness. A 1:2 molar ratio of $PdCl_2$ to $SnCl_2$ was formed by addition of 50.90 gms. of $SnCl_2.2H_2O$. This mixture was heated to 95° C. for 15 minutes, forming a homogenous solution, and a 1.67 gm. sample was extracted. Then 350 gms. of $SnCl_2.2H_2O$, producing 1:16 molar ratio, were liquified in solution, requiring about 5 minutes. A 6.0 gm. sample was extracted to prepare a working bath. A third addition of 1160 gms. of $SnCl_2.2H_2O$ was made increasing the molar ratio of $PdCl_2$ to $SnCl_2$ to 1:63. This quantity was stirred until homogenous, about 5 minutes, and a 20.35 gm. sample was extracted. The catalyst was then cooled to room temperature. Working baths were prepared by dissolving the extracted samples in 242 mls. of HCl and 750 mls. of $H_2O$.

Using the prescribed cycles, test plaques molded of ABS (EP 3510) and a phenylene oxide-based resin (General Electric Co.—Noryl PN-235) were processed through these catalyst working baths, in the same manner as Example I, to determine catalytic activity by electroless coverage. The coverage results are given in Table I.

Table I

| | | Coverage | |
|---|---|---|---|
| Example | Catalyst | ABS (EP-3510) | Noryl (PN-235) |
| II | Initial $PdCl_2:SnCl_2$ ratio 1:2 Final $PdCl_2:SnCl_2$ ratio 1:2 | Poor | Poor |
| III | Initial $PdCl_2:SnCl_2$ ratio 1:2 Final $PdCl_2:SnCl_2$ ratio 1:16 | Excellent | Excellent |
| IV | Initial $PdCl_2:SnCl_2$ ratio 1:2 Final $PdCl_2:SnCl_2$ ratio 1:63 | Excellent | Excellent |

The samples were allowed to stand for three days to test stability. The catalyst having a final 1:2 molar ratio, beside being inactive, formed a black precipitate with a clear solution; but all other samples began plating after only 10 seconds in the electroless nickel bath. It is estimated that the final $PdCl_2:SnCl_2$ ratio must be at least 1:2 to have minimal catalytic activity.

EXAMPLE V

The two-step addition of $SnCl_2.2H_2O$ was extremely effective for increasing catalyst activity. Several experiments were conducted to establish its importance. Two grams of $PdCl_2$ were weighed into a 150 ml. beaker and placed in a water bath at 95° C. To this 5.09 gms. of $SnCl_2.2H_2O$ were added and heated to 95° C. for 15 minutes. Then 137.7 gms. of $SnCl_2.2H_2O$ were added, liquified and stirred for 5 minutes at 95° C. The solution was cooled and weighed.

17.12 gms. of catalyst were added to 242 mls. of HCl and 750 mls. of $H_2O$ to prepare a working bath. The working bath was a dark black solution which lacked the usual reddish-brown color and was not catalytic for plating of ABS plaques. This is evidence that without KCl, or other metal halide, in combination with the noble metal salt, the molten salt reaction will not produce an active catalyst.

EXAMPLE VI

In another procedure, dry salts of 2 gms. $PdCl_2$ and 6.72 gms. KCl were heterogenously mixed and placed in a beaker in a water bath at 95° C. As before, 5.09 gms. of $SnCl_2.2H_2O$ were added and the reaction was continued for 15 minutes at 95° C. An addition of 137.7 gms. of $SnCl_2.2H_2O$ was made and the reaction was continued another 15 minutes at 95° C. Based on the final sample weight of 149.1 gms., a working bath was prepared by adding 18.04 gms. of catalyst to 242 mls. of HCl and 750 mls. of $H_2O$. Coverage results on ABS plaques was excellent.

EXAMPLE VII

Another sample was prepared by weighing 6.72 gms. of KCl and 5.09 gms. of $SnCl_2.2H_2O$ into a 150 ml. beaker and heating to 95° C. Upon reaching 95° C., 2 gms. of $PdCl_2$ were added and the reaction was continued at 95° C. for 15 minutes. As before, 137.7 gms. of $SnCl_2.2H_2O$ were added and an additional 15 minute reaction was sustained. Based on the sample weight of 148.8 gms., 18.00 gms. were dissolved in 242 mls. of HCl and 750 mls. of H$_2$O to prepare a working bath. Coverage on ABS plaques was only fair; but the procedure was not optimized for that particular catalyst.

EXAMPLE VIII

To determine optimum reaction conditions a series of reactions were run at different temperatures. The reaction temperatures were 60°, 80°, 95°, and 105° C. Eight gms. of PdCl$_2$ and 26.88 gms. of KCl (a 1:8 molar ratio) were dissolved in 200 mls. of water. Fifty mls. were transferred to four separate 150 ml. beakers and evaporated to dryness. At each reaction temperature, an initial addition of SnCl$_2$.2H$_2$O was made on a 1:2 molar ratio of PdCl$_2$ to SnCl$_2$.2H$_2$O. After reaction for 15 minutes at the respective temperatures, a second addition of SnCl$_2$.2H$_2$O was made so that the final molar ratio was 1:56. After the second addition, the reaction was continued for 15 minutes at the respective temperatures. In each case, the double salt mixture was in the form of very dry chunks. For the 60° C. reaction, large chunks were present and did not dissolve after either the first or second additions of SnCl$_2$.2H$_2$O. In all reactions, the initial SnCl$_2$.2H$_2$O addition was not enough to produce a molten solution, but only a paste which dried within 15 minutes. For the subsequent reactions, the double salt mixture was ground into a fine powder both before and after the initial SnCl$_2$.2H$_2$O addition. From the weights of the catalysts after reaction, working baths were prepared equivalent to the Example II concentration. Between 17.6 and 18 gms. of solid catalyst were added to 242 mls. of HCl and 750 mls. of H$_2$O to prepare working baths. Coverage on ABS (EP-3510) and Noryl (PN-235) plaques was excellent for all samples, regardless of reaction temperature.

EXAMPLE IX

A dry catalyst was prepared in which anhydrous SnCl$_2$ and SnCl$_2$.2H$_2$O were mixed and reacted with the double salt of PdCl$_2$ and KCl. The melting point of the dry catalyst was increased appreciably by addition of the anhydrous SnCl$_2$. The catalyst was prepared in the following manner:
1. To a three-neck 100 ml. reaction flask, 11.45 gms. of SnCl$_2$.2H$_2$O and 3.21 gms. of anhydrous SnCl$_2$ were added.
2. The reactor ports were closed, and the tin chloride melted at 80° C.
3. The 18.82 gms. of the PdCl$_2$ and KCl double salt (1:20 molar ratio of PdCl$_2$:KCl) were added to the tin chloride in the reactor at 80° C. and reacted for 30 minutes.
4. 127.53 gms. of SnCl$_2$.2H$_2$O were added and reacted for 15 minutes at 80° C., and then cooled to room temperature.

18 gms. of the final product were dissolved in 242 mls. of concentrated HCl and 750 mls. of water to prepare a catalyst working bath. A series of ABS plaques (EP-3510) were processed through the standard electroless plating cycle using this solution to catalyze the surface. The solution catalyzed the surface of the plastic so that excellent electroless plating coverage was obtained. The melting point of the dry catalyst was increased beyond 120° C. by this method of preparation.

EXAMPLE X

A catalyst composition was prepared in which the anion of the precious metal salt and the compatible anion provided by alkali or alkaline earth metal halide were different. The dry salts of PdSO$_4$ and NaCl were physically mixed and added to molten SnCl$_2$.2H$_2$O to provide an active catalyst. The catalyst was prepared as follows:
1. 2.28 gms. of PdSO$_4$ and 2.64 gms. of NaCl dry salts were physically mixed and added to 25.45 gms. of molten SnCl$_2$.2H$_2$O at 95° C. in a closed reactor.
2. The reaction was continued for 15 minutes at 95° C.
3. 117.35 gms. of SnCl$_2$.2H$_2$O at 95° C. were added to the reactor and reacted 15 minutes at that temperature, and then cooled to room temperature.

20 gms. of the final product were dissolved in 242 mls. of concentrated HCl and 750 mls. of H$_2$O to prepare a catalyst working bath. ABS plaques (EP-3510) were processed through the standard preplate cycle and this solution. The solution catalyzed the surface of the ABS so that excellent electroless plating coverage was obtained.

EXAMPLE XI

Working baths may be prepared using various acid normalities and with substitution of part or all of the HCl with KCl, MgCl$_2$.6H$_2$O, H$_2$SO$_4$ or CH$_3$COOH. Acid normality had a minimal effect of coverage when varied over a wide range from 3 N to 9 N. Sulfuric acid working baths employing the solid catalyst of Example IV produced excellent results as did baths in which 50% of the HCl was replaced by chloride salts. Baths in which HCl was totally replaced with CH$_3$COOH or chloride salts were not catalytically active.

EXAMPLE XII

A catalyst composition was prepared in which the compatible anion was provided by a bromide salt KBr. The PdCl$_2$ and KBr were dissolved in solution and evaporated to produce a double salt which is effective for the preparation of a catalytically active dry catalyst. The method of preparation was:
1. 2.1 gms. of PdCl$_2$ and 11.27 gms. of KBr were dissolved in approximately 50 mls. of H$_2$O. The solution was evaporated to produce the dry salt.
2. 12.70 gms. of this salt were added to 25.45 gms. of molten SnCl$_2$.2H$_2$O at 95° C. in a three-necked 100 ml. reaction flask and reacted for 15 minutes at 95° C.
3. 117.35 gms. of molten SnCl$_2$.2H$_2$O at 95° C. were added and reacted for 15 minutes at that temperature and then cooled to room temperature.

18 gms. of this material were added to 242 mls. of concentrated HCl and 750 mls. of H$_2$O to prepare a catalyst working bath. Excellent electroless plating coverage was obtained when ABS plaques (EP-3510) were processed through the standard preplate cycle using this catalyst solution.

EXAMPLE XIII

It is recognized in the art that some thermoplastic resins are easier to plate, and have better adhesion, than others. ABS (graft polymers of acylonitrile, butadiene and styrene) is the most widely used plating resin although polypropylene and poly phenylene oxide based resins (Noryl) also can be plated with good results.

The catalyst of Example IV was made up into a working bath with HCl such that the Pd concentration was 0.1875 gm./l. Plaques of ABS(EP-3510), polypropylene (Avisun TD-253) and Noryl (PN-235) were plated using, in each case, the recommended preplate cycle for the particular resin. Excellent coverage was obtained in every sample.

EXAMPLES XIV TO XIX

Six different solid catalysts were prepared to determine if there was an optimum molar ratio of $PdCl_2$ to initial $SnCl_2$ addition. Two were prepared with a 1:2 molar ratio of $PdCl_2$ to KCl and four were prepared with a 1:8 molar ratio. The molar ratios of $PdCl_2$ to initial $SnCl_2.2H_2O$ evaluated were 1:1, 1:2, 1:4, 1:10, and 1:20. In each case, the reaction was performed as follows:

1. Solutions containing the appropriate amounts of $PdCl_2$ and KCl were prepared and evaporated to dryness in a rotary evaporator. A small amount of moisture remained.
2. A portion of the $PdCl_2$ and KCl salts was transferred to 150 ml. beaker and placed in a water bath at 95° C.
3. Solid $SnCl_2.2H_2O$ was added in the appropriate ratio of from 1:1 to 1:20.
4. The resultant molten salt was stirred while reacting for 15 minutes at 95° C.
5. A second solid addition of $SnCl_2.2H_2O$ was made, heated, liquified, and stirred another 15 minutes at 95° C. The final molar ratio of $PdCl_2$ to $SnCl_2.2H_2O$ was 1:56.
6. The sample was cooled while stirring and weighed so that working baths of the proper Pd concentration could be prepared. Table I shows the exact quantities involved with each of the six reactions.

TABLE I

| Example No. | XIV | XV | XVI | XVII | XVIII | XIX |
|---|---|---|---|---|---|---|
| gms. of $PdCl_2$ . KCl salt | 4.515 | 4.515 | 8.98 | 8.98 | 8.98 | 8.98 |
| $PdCl_2$ . KCl molar ratio | 1:2 | 1:2 | 1:8 | 1:8 | 1:8 | 1:8 |
| gms initial $SnCl_2$ . $2H_2O$ add | 2.47 | 4.93 | 2.55 | 10.18 | 25.45 | 50.90 |
| $PdCl_2$ . initial $SnCl_2$ . $2H_2O$ molar ratio | 1:1 | 1:2 | 1:1 | 1:4 | 1:10 | 1:20 |
| State of catalyst after initial 15 min. reaction | dry powder | paste | dry powder | paste | liquid | liquid |
| gms. final $SnCl_2$ . $2H_2O$ add | 135.80 | 133.30 | 140.25 | 132.62 | 117.35 | 91.90 |
| Final weight | 144.31 | 139.38 | 149.31 | 148.64 | 147.28 | 148.51 |
| Weight loss of $H_2O$ of crystallization | 0 | 3.36 | 2.47 | 3.14 | 4.50 | 3.27 |
| gms. of catalyst per liter of working bath | 18.04 | 17.42 | 18.07 | 17.99 | 17.82 | 17.97 |

From calculation each working bath should be the concentration of a Control Solution when the above amounts are added to 242 mls. of HCl and 750 mls. of $H_2O$. ABS(EP-3510) and Noryl(PN-235) plaques were processed through these working baths and the standard preplate cycle. Again coverage is the criterion for establishing the best molar ratios to use for catalyst preparation. Table II gives the results.

Table II

| Ex. No. | $PdCl_2$. KCl RATIO | $PdCl_2$ . INITIAL $SnCl_2$ RATIO | COVERAGE ABS | NORYL |
|---|---|---|---|---|
| XIV | 1:2 | 1:1 | F | P |
| XV | 1:2 | 1:2 | E | E |
| XVI | 1:8 | 1:1 | E | E |
| XVII | 1:8 | 1:4 | E | E |
| XVIII | 1:8 | 1:10 | E | E |
| XIX | 1:8 | 1:20 | E | E |

E = excellent;
F = fair;
P = poor

EXAMPLE XX

Catalyst compositions may also be prepared using a compatible anion such as the alkaline earth metal halid $CaCl_2.6H_2O$. The final product was effective as a catalytic material but differed from others in that it was a very concentrated liquid at room temperature.

The procedure for preparation was:
1. 2.0 gms. of $PdCl_2$ and 20.75 gms. $CaCl_2.6H_2O$ were mixed, heated, liquified, and stirred until the mixture was homogenous.
2. To this solution was added 25.45 gms. of $SnCl_2.2H_2O$ at 95°.
3. The reaction was continued for 15 minutes at 95° C.
4. Then 117.35 gms. of $SnCl_2.2H_2O$ at 95° C. were added and reacted an additional 15 minutes at that temperature.

The final product remained as a liquid at room temperature. A working bath of this catalyst was prepared containing 18 gm./l. of catalyst in 242 mls. of concentrated HCl and 750 mls. of $H_2O$. Excellent electroless plating coverage was obtained when ABS plaques (EP-3510) were processed through the standard preplate cycle using this catalyst solution.

EXAMPLE XXI

The property of air agitation stability was determined by bubbling air through 250 mls. of working bath in a 250 ml. graduated cylinder. Air is passed through a gas diffusion bulb at the bottom of the graduated cylinder at the rate of 1200 cc/minute until the catalyst working bath complex is broken. This test gives a relative value for the working bath life of a particular catalyst. The longer the time of air agitation required to break the complex, the longer the working bath with remain stable in actual operation.

The air stability test was performed on two working baths prepared with solid catalysts. The catalysts were Example XVIII and a second sample (Example XXI) prepared identically except for the initial molten state reaction time. The initial reaction time was extended from 15 minutes (XVIII) to 2 hours (XXI).

Working baths of Examples XVIII and XXI were prepared by dissolving 17.82 gms. and 18.12 gms. respectively in dilute HCl solutions containing 242 mls. of HCl and 750 mls. of $H_2O$. The results of the air stability tests on these working baths are given in Table III.

Table III

| Catalyst | Catalyst Reaction Time | | Total Hours Air Agitation Before Catalyst Decomposition |
|---|---|---|---|
| | Initial | Final | |
| Example XVIII | 15 min. | 15 min. | 7.5 hrs. |
| Example XXI | 2 hrs. | 15 min. | 28 hrs. |

The results show that the reaction time variation improved air stability nearly fourfold. Example XXI also provided excellent electroless plating coverage.

EXAMPLE XXII AND XXIII

A catalyst composition is prepared in which the compatible anion is provided by a transitional metal halide $NiCl_2.6H_2O$ or by the rare earth metal halide $LaCl_3.7H_2O$. The $PdCl_2$ and $NiCl_2.6H_2O$ or $LaCl_3.7H_2O$ salts are dissolved in water and evaporated to produce a double salt which is effective for preparation of a catalytically active material.

The method of preparation is:
1. 2.1 gms. of $PdCl_2$ and either 2.82 gms. of $NiCl_2.6H_2O$ or 4.41 gms. of $LaCl_3.7H_2O$ (XXIII) are dissolved in approximately 50 mls. of $H_2O$. The solution is evaporated to produce the dry salt.
2. The total amount of each dry salt mixture was added to separate quantities of 25.45 gms. of $SnCl_2 2H_2O$ at 95° C. in three-necked 100 ml. reaction flasks and reacted for 15 minutes at 95° C.
3. 117.35 gms. of molten $SnCl_2.2H_2O$ are then added to each flask and reacted for 15 minutes at that temperature and then cooled to room temperature.

Both the Ni-Sn-Pd (XXIII) and the La-Sn-Pd (XXIII) samples gave excellent plating coverage on ABS when used in a catalytic working bath.

EXAMPLE XXIV

A catalyst composition was prepared in which the compatible anion was provided by the alkaline earth halide $MgCl_2.6H_2O$. The $PdCl_2$ and $MgCl_2.6H_2O$ salts were dissolved in solution and evaporated to produce a double salt which is effective for preparation of a catalytically active material.

The method of preparation was:
1. 2.1 gms. of $PdCl_2$ and 19.26 gms. of $MgCl_2.6H_2O$ were dissolved in approximately 50 mls. of $H_2O$. The solution was evaporated to produce the dry salt.
2. 20.29 gms. of this salt were added to 25.45 gms. of $SnCl_2.2H_2O$ at 95° C. in a three-necked 100 ml. reaction flask and reacted for 15 minutes at 95° C.
3. 117.35 gms. of molten $SnCl_2.2H_2O$ at 95° C. were added and reacted for 15 minutes at that temperature and then cooled to room temperature.

18 gms. of this material were dissolved in 242 mls. of concentrated HCl and 750 mls. of $H_2O$ to prepare a catalyst working bath. ABS plaques were processed through the standard preplate cycle and this solution. The solution catalyzed the surface of the ABS so that excellent electroless plating coverage was obtained.

EXAMPLE XXV

A molten salt catalyst was prepared which contained a fluorocarbon surfactant (FC-95, manufactured by 3M Company).

As described in the Condensed Chemical Dictionary (Sixth Ed.)—Reinhold 1961, "FC-95" is one of a family of very stable and active "Fluorochemical Surfactants" available as anionic and cationic types useful in aqueous systems. The surfactant was added directly to the molten salt reaction mixture during the second addition of $SnCl_2.2H_2O$. The procedure used for preparation of the material was:

1. 25.46 gms. of $SnCl_2.2H_2O$ was preheated to 95° C. in a 100 ml. three-neck reaction flask.
2. To this was added 3.68 gms. of the double salt formed by the reaction of 10.50 gms. of $PdCl_2$ and 8.83 gms. of KCl.
3. The reactor was sealed and held at 95° C. for 15 minutes.
4. At this time an additional 117.35 gms. of $SnCl_2.2H_2O$ in which was suspended 0.95 gms. of the fluorocarbon surfactant FC-95 was added to the reactor.
5. The reactor was again sealed and held at 95° C. for 15 minutes at which time the mixture was allowed to cool to room temperature.
6. The final reaction product was a solid at room temperature.

15.7 gms. of the final reaction product was dissolved in a mixture of 250 mls. of concentrated hydrochloric acid and 750 mls. of deionized water to prepare a working bath. A series of ABS plaques (EP-3510) were processed through the standard electroless plating cycle using this solution to catalyze the surface. The solution catalyzed the surface of the plastic so that excellent electroless plating coverage was obtained.

EXAMPLE XXVI

A sample of a catalyst was used which had an approximate freezing point of 90° C. This catalyst had been prepared using a mixture of tin chloride, palladium chloride, and potassium chloride.

Separate 20 g. samples of the dry catalyst were placed in 5 beakers and heated until the catalyst liquified. To each sample was then added 4 g. of one of the following: sodium oxalate (I), sodium citrate (II), sodium sulfate (III), borax (IV), or sodium acetate (V). After thorough mixing the beakers were removed and thermometers were placed in each beaker. The temperature at which the main portion of the solution seemed to crystallize was noted. These are shown in Table IV.

Table IV

| Salt | Major Freezing Point |
|---|---|
| Na citrate | 85°–90° C. |
| Na acetate | 40°–45° C. |
| Na oxalate | >125° C. |
| Na sulfate | 80°–85° C. |
| Borax | 105°–110° C. |
| Control | >90° C. |

These additions had no adverse effect on the plating ability of the catalyst. A 11.0 g. sample of each was dissolved in 120 mls. of concentrated hydrochloric acid and 380 mls. distilled water. A series of ABS panels (EP-3510) was processed through the standard electroless plating cycle, using these solutions to catalyze the surface. Excellent plating coverage was obtained.

By way of summary, the source of the metal halide should be a chloride or bromide (Example XII); and the cation may be an alkali metal (Examples I–IV, VI–X, XII and XIV–XIX); an alkaline earth metal (Example XX and XXIV); a rare earth metal (Example XXIII); or a transition metal (Example XXII).

While this invention has been described in connection with certain specific embodiments thereof, it is to be understood that this is by way of illustration and not by way of limitation; and the scope of the appended claims should be construed as broadly as the prior art will permit.

What is claimed is:

1. A concentrated, catalytically active composition, suitable for initiating electroless deposition of metal, the active constituent thereof consisting essentially of the reaction product of: (1) a molten tin salt; (2) a palladium salt; and (3) an effective amount of a metal halide selected from the group consisting of chloride and bromide compatible with said tin and palladium salts, the cation of component (3) selected from the group consisting of alkali metals, alkaline earth metals, rare earth metals and transition metals, said reaction product being substantially free from an extrinsic source of acid and wherein the molar ratio of tin to palladium is at least 2:1.

2. A composition as defined in claim 1 wherein said tin salt is selected from the group consisting of stannous chloride dihydrate and anhydrous stannous chloride.

3. A composition as defined in claim 2 wherein said tin salt is stannous chloride dihydrate.

4. A composition as defined in claim 1 wherein said metal halide is an alkali metal halide.

5. A composition as defined in claim 1 wherein said metal halide is an alkaline earth metal halide.

6. A composition as defined in claim 4 wherein said alkali metal halide is potassium chloride.

7. A composition as defined in claim 1 wherein said palladium salt is palladium chloride.

8. A composition as defined in claim 1 wherein said molten tin salt consists essentially of stannous chloride dihydrate, said palladium salt consists essentially of palladium chloride, and said metal halide consists essentially of potassium chloride.

9. A composition as defined in claim 1 additionally containing a compatible wetting agent.

10. A composition as defined in claim 9 wherein said wetting agent is a fluorocarbon surfactant.

11. A composition as defined in claim 1 additionally containing an inert diluent.

12. A composition as defined in claim 8 additionally containing a compatible wetting agent.

13. A composition as defined in claim 11 wherein said inert diluent is selected from the group consisting of metal sulfates, bisulfates, acetates, halides, citrates and oxalates.

14. A composition as defined in claim 1 wherein the molar ratio of palladium to tin is between 1:2 and 1:100.

15. A method of preparing a concentrated catalytically active composition suitable for initiating electroless deposition of metal comprising the steps of: (1) reacting together (a) a molten tin salt; (b) a palladium salt; and (c) an effective amount of a metal halide selected from the group consisting of chloride or bromide compatible with said tin and palladium salts, the cation of component (c) selected from the group consisting of alkali metals, alkaline earth metals, rare earth metals and transition metals, for a sufficient time to form a catalytically active species, and (2) cooling the reaction product to room temperature.

16. A method as defined in claim 15 wherein said tin salt is stannous chloride dihydrate.

17. A method as defined in claim 16 wherein said palladium salt is palladium chloride.

18. A method as defined in claim 17 wherein said metal halide is a chloride.

19. A method as defined in claim 18 wherein said palladium chloride is first reacted with said metal chloride to form a double salt and is then subsequently reacted with said stannous chloride dihydrate.

20. A method as defined in claim 19 wherein the molar ratio of tin to palladium is at least 2:1.

21. A method as defined in claim 20 wherein said metal chloride is potassium chloride.

22. A method of preparing a concentrated catalytically active composition suitable for initiating electroless deposition of metal comprising the steps of: (1) reacting together: (a) a molten tin salt; (b) a palladium salt and (c) a metal halide selected from the group consisting of chloride and bromide compatible with said tin and palladium salts, the cation of component (c) selected from the group consisting of alkali metals, alkaline earth metals, rare earth metals and transition metals, the amount of tin salt being less than that desired in the final reaction product; (2) adding a second quantity of a tin salt sufficient to give the concentration desired in the final reaction product; (3) continuing the reaction for a time sufficient to form a catalytic species; and (4) cooling the reaction product to room temperature.

23. A method as defined in claim 22 wherein said tin salt is stannous chloride dihydrate.

24. A method as defined in claim 23 wherein said palladium salt is palladium chloride.

25. A method as defined in claim 24 wherein said metal halide is a chloride.

26. A method as defined in claim 25 wherein said palladium chloride is first reacted with said metal chloride to form a double salt and is then subsequently reacted with said stannous chloride dihydrate.

27. A method as defined in claim 26 wherein the molar ratio of tin to palladium is at least 2:1.

28. A method as defined in claim 27 wherein said metal chloride is potassium chloride.

* * * * *